H. HUGHEY.
LOCK BOLT.
APPLICATION FILED MAY 2, 1911. RENEWED JAN. 7, 1913.
1,053,604.
Patented Feb. 18, 1913.
2 SHEETS—SHEET 1.
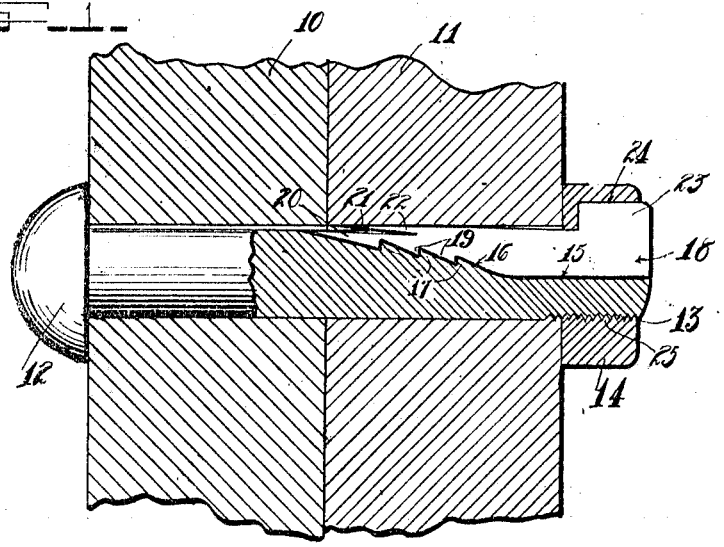
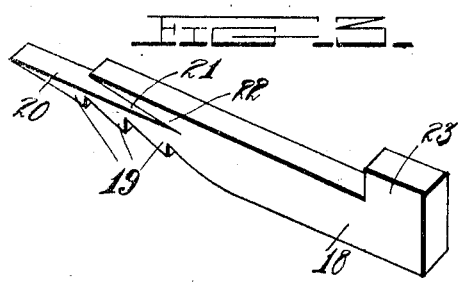
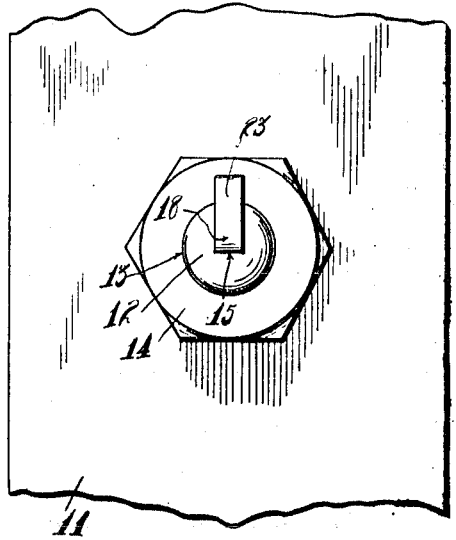
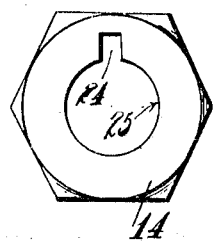
Witnesses
M. C. Fielding.
J. P. Burch.
Inventor
Henry Hughey.
By
Attorneys

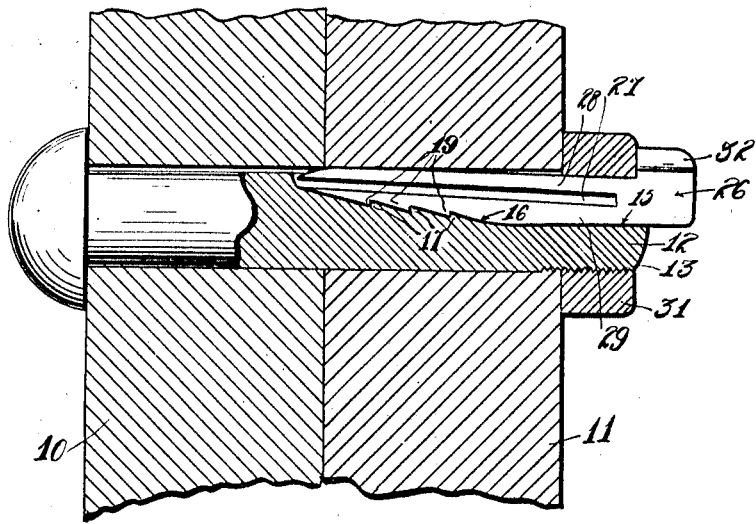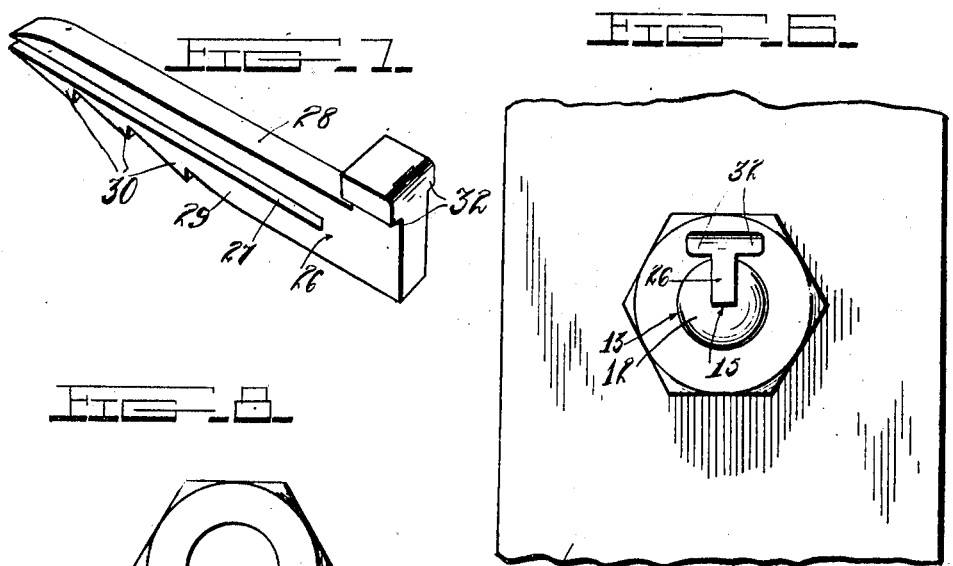

UNITED STATES PATENT OFFICE.

HENRY HUGHEY, OF SOUTH DUDSWELL, QUEBEC, CANADA.

LOCK-BOLT.

1,053,604.      Specification of Letters Patent.      Patented Feb. 18, 1913.

Application filed May 2, 1911, Serial No. 624,595. Renewed January 7, 1913. Serial No. 740,694.

*To all whom it may concern:*

Be it known that I, HENRY HUGHEY, a subject of the King of England, residing at South Dudswell, in the Province of Quebec, Dominion of Canada, have invented certain new and useful Improvements in Lock-Bolts; and I do hereby declare the following to be a full, clear, and exact description of the invention, such as will enable others skilled in the art to which it appertains to make and use the same.

This invention relates to lock bolts and the object of the invention is to provide a novel and efficient device of this character adapted for use in connection with machinery, railroad construction and like uses wherein the parts are subject to severe strains and jars so as to positively prevent bolts from becoming loose and thus avoiding serious accidents.

A specific object of the invention is to provide a bolt with a longitudinal slot having a series of serrations or teeth adapted to engage with similarly formed teeth of a locking pin of resilient construction, thereby efficiently serving to hold a nut on the bolt.

A still further object of the invention is to provide a locking pin which is provided with a longitudinal slot forming a resilient portion adapted to permit the pin to be fully inserted in the slot of the bolt, when the bolt is positioned through an object to be secured.

With these and other objects in view the invention consists of certain other combinations and arrangements of parts as will be hereinafter more fully described and claimed, it being a still further object to provide a device which will not be likely to get out of working order.

In the drawings:—Figure 1 is a longitudinal sectional view of the preferred embodiment of my invention applied to two sections of material which are to be secured together. Fig. 2 is an end view thereof. Fig. 3 is a detail perspective view of a locking key employed in connection with the device. Fig. 4 is a detailed view of the nut employed. Fig. 5 is a view similar to Fig. 1, but showing a slightly modified construction. Fig. 6 is an end view thereof. Fig. 7 is a detailed perspective view of a locking pin employed. Fig. 8 is a detail view of the nut.

Referring to the drawings in detail, there are shown two sections 10 and 11 which are adapted to be secured together, each of the sections being provided with corresponding openings adapted to snugly receive a headed bolt 12 having threads 13 upon one end adapted for the securing of a nut 14 on the bolt. By reference to Fig. 1 of the drawings it will be seen that the bolt 12 is provided with a longitudinal slot 15 which tapers from the surrounding face of the bolt toward its outer end to provide an inclined wall 16 which is provided with a series of notches or serrations 17 which have vertical inner walls and inclined outer walls so as to permit the insertion of the locking pin 18 but to prevent withdrawal thereof. The pin 18 is provided with a series of teeth 19 adapted to engage with the serrations formed in the slot 15 of the bolt 12, the shank of the pin being tapered to form a point 20 and having a tapered slit 21 forming a supplementary resilient shank 22 which is adapted to be depressed when the pin is inserted and to contact with the bores of the sections secured together and to be depressed thereby without causing mutilation of the teeth as in ordinary wedge keys. The pin 18 is provided with a head 23 which is adapted to fit into a slot 24 formed in the wall of the threaded bore 25 of the nut 14 when the pin is in position and the nut is threaded upon the bolt, thereby preventing rotation of the nut and rendering it impossible for the sections to become separated and the nut in order to be removed must be cut.

In the modified form shown in Fig. 5 of the drawings, the bolt 12 is formed in a similar manner and is adapted to receive a locking pin 26, said locking pin being provided with a longitudinal slot 27 throughout its length and providing an upper or supplementary resilient shank 28 and a lower shank 29 which is provided with teeth 30 adapted to engage the serrations 17 of the bolt. In this construction a nut 31 is threaded upon the bolt and instead of providing the slot 24, the head of the pin is provided with opposite flanges 32 which are adapted to engage the outer face of the nut and prevent removal thereof without cutting off the head of the pin.

In use, when the pin is inserted in the slot of the bolt, the upper or supplementary shank portion of the pin will be depressed by reason of its resiliency and tapered end, allowing the teeth to slide over the serrations formed in the slot, thereby allowing the pin to be forced to a tightened position to engage the securing nut without mutilating the teeth or parts as ordinarily caused by a wedge-pin. It will thus be seen that the nut will be positively held in position, thereby securely holding the sections together and proving especially advantageous in railroad construction, machinery and such devices which are subject to constant jar.

I claim:—

1. In a lock bolt, the combination with a bolt having a tapered slot; of a nut engaged upon the bolt and a pin having a supplementary resilient shank portion adapted to permit insertion of the pin in the slot for engagement of the head of the pin with the nut to hold the latter against removal, said pin having a tapered end conforming to the slot and being held against removal inwardly of the nut.

2. A lock bolt comprising a bolt having a tapered slot formed with serrations, a nut threaded on the bolt and a locking pin inserted in the slot to prevent removal of the nut, said pin having a slot forming a resilient supplementary shank, the shank proper having teeth formed thereon to engage the serrations and hold the pin against removal and also engaging the nut to hold it against displacement, said supplementary shank being adapted to contact with the bore of the sections secured together and permit of the teeth to be forced over the serrations.

3. In a lock bolt, a bolt having a longitudinal tapered slot communicating with its outer end, the bottom wall of the slot being formed with serrations, a nut engaged on the bolt and a pin engaged through the bore of the nut and fitted in the slot beyond the nut, said pin having a longitudinal slot forming a pair of pointed shanks, one of said shanks being provided with teeth adapted to engage the notches of the bolt and the other shank being adapted to be resiliently depressed upon insertion in the bolt by contact with the parts secured together to hold the teeth engaged with the notches and prevent removal of the pin without mutilation thereof, said pin having a head engaging the nut at its outer portion.

In testimony whereof, I affix my signature, in presence of two witnesses.

HENRY HUGHEY.

Witnesses:
   ALDEN LEARNED,
   GEO. HILLIAM.